United States Patent
Portal et al.

[11] Patent Number: 5,813,220
[45] Date of Patent: Sep. 29, 1998

[54] JET ENGINE THRUST REVERSER HAVING A MOVABLE DOOR AND A MOVABLE PANEL PRESSURIZED TO THE CLOSED, FORWARD THRUST POSITION

[75] Inventors: Jean-Fabrice Marcel Portal, Sainte Adresse; Guy B. Vauchel, Le Havre, both of France

[73] Assignee: Societe Hispano Suiza, Saint Cloud Cedex, France

[21] Appl. No.: 604,418

[22] Filed: Feb. 21, 1996

[30] Foreign Application Priority Data

Feb. 21, 1995 [FR] France .................................. 95.01960

[51] Int. Cl.⁶ ........................................................ F02K 3/02
[52] U.S. Cl. ........................ 60/226.2; 60/230; 244/110 B; 239/265.29
[58] Field of Search .................................. 60/226.2, 230; 244/110 B; 239/265.19, 265.27, 265.29

[56] References Cited

U.S. PATENT DOCUMENTS

| | | |
|---|---|---|
| 3,279,182 | 10/1966 | Helmintoller . |
| 3,601,992 | 8/1970 | Maison .................................. 60/226.2 |
| 3,605,411 | 9/1971 | Maison et al. . |
| 3,831,376 | 8/1974 | Moorehead . |
| 4,005,836 | 2/1977 | Mutch . |
| 4,545,199 | 10/1985 | Sankey et al. ........................ 60/226.2 |
| 4,801,112 | 1/1989 | Fournier et al. ...................... 60/226.2 |
| 4,894,985 | 1/1990 | Dubois et al. . |
| 4,960,243 | 10/1990 | Dubois et al. ........................ 60/226.2 |
| 5,243,817 | 9/1993 | Matthias . |
| 5,267,438 | 12/1993 | Bunel et al. .......................... 60/226.2 |
| 5,297,387 | 3/1994 | Carimali et al. . |

FOREIGN PATENT DOCUMENTS

| | | |
|---|---|---|
| 0 067 747 | 12/1982 | European Pat. Off. . |
| 0 365 425 | 4/1990 | European Pat. Off. . |
| 0 542 624 | 11/1993 | European Pat. Off. . |
| 1482538 | 5/1967 | France . |
| 2 030 034 | 10/1970 | France . |
| 2 618 853 | 3/1989 | France . |
| 2 651 021 | 8/1991 | France . |
| 2 680 547 | 2/1993 | France . |
| 2 704 907 | 11/1994 | France . |
| 2152031 | 4/1972 | Germany ........................... 244/110 B |

OTHER PUBLICATIONS (WIPO) WO 93/16279–Aug. 19, 1993—LAIR, Jean–Pierre.

*Primary Examiner*—Timothy Thorpe
*Assistant Examiner*—Ted Kim
*Attorney, Agent, or Firm*—Bacon & Thomas

[57] ABSTRACT

A thrust reverser is disclosed in which a panel is pivotally attached to the cowling downstream of the movable thrust reverser door and is connected to the door such that movement of the thrust reverser door causes the panel to pivot about its attachment to the cowling. When the door is in its forward thrust position, the inner wall of the door and an inner wall of the panel form a portion of the boundary of the duct through which pass pressurized gases. The pressurized gases exert forces on the inner wall of the door and the inner surface of the panel such that the forces urge the thrust reverser door toward its forward thrust position. Thus, the thrust reverser door is prevented from being inadvertently deployed toward its reverse thrust position even upon failure or malfunction of the door locking or latching mechanisms.

7 Claims, 6 Drawing Sheets

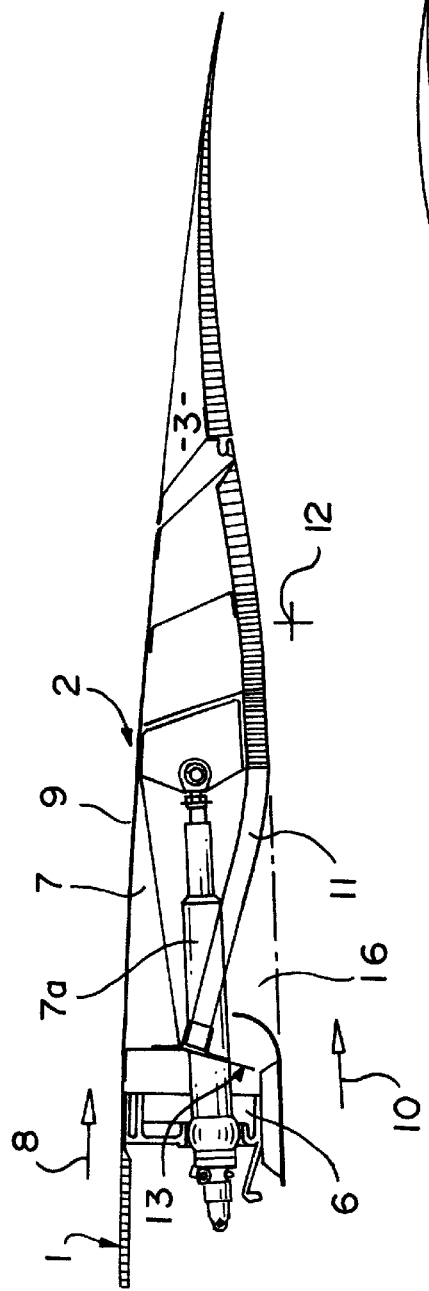
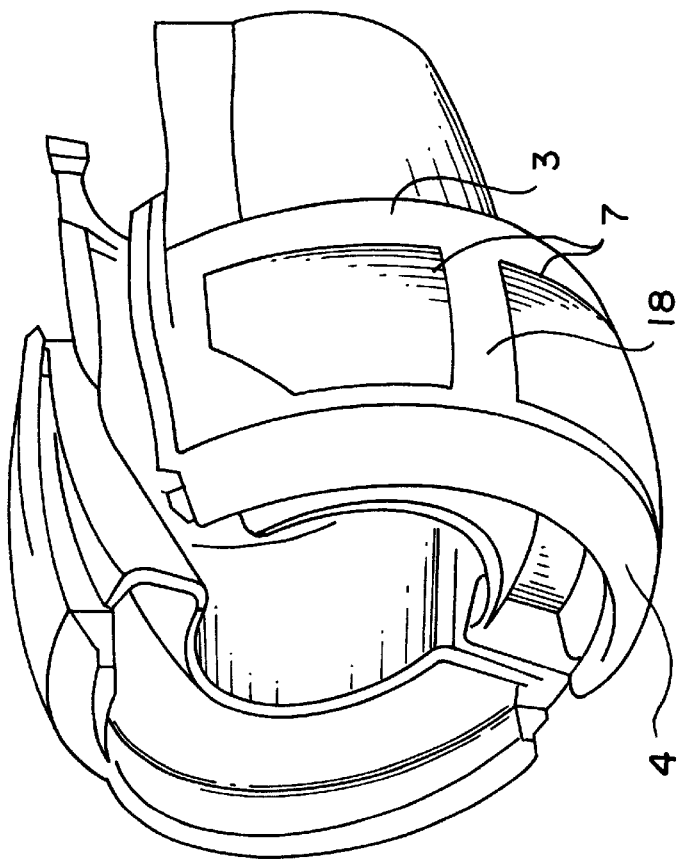
FIG. 1
(PRIOR ART)
FIG. 2
(PRIOR ART)

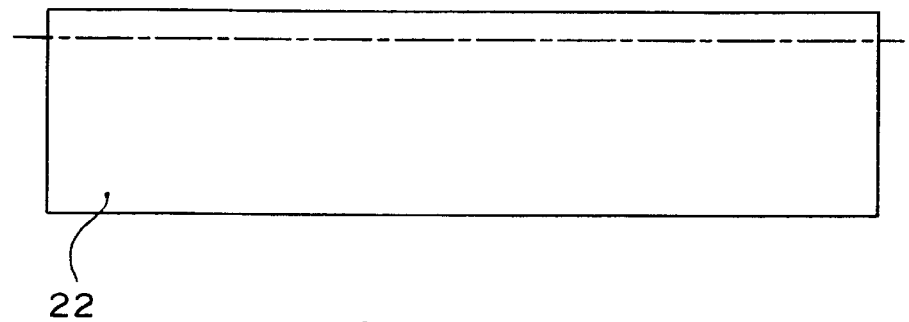
FIG. 7
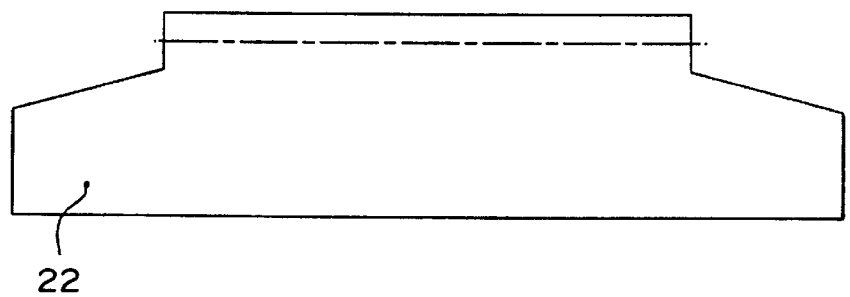
FIG. 8
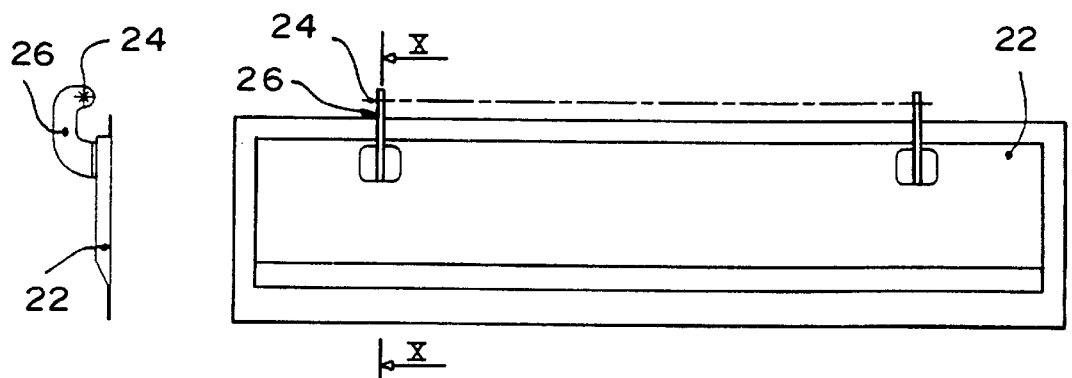
FIG. 10
FIG. 9

JET ENGINE THRUST REVERSER HAVING A MOVABLE DOOR AND A MOVABLE PANEL PRESSURIZED TO THE CLOSED, FORWARD THRUST POSITION

BACKGROUND OF THE INVENTION

The present invention relates to a thrust reverser for a turbojet engine, more particularly such a thrust reverser utilized with a high-bypass turbojet engine in which the thrust reverser has a movable door and an associated movable panel whereby the pressurized gas acting on the interior surfaces of the door and panel urges the door to its forward thrust position.

Turbojet engine thrust reversers are well-known in the art and typically comprise one or more thrust reverser doors pivotally attached to an engine cowling such that doors are movable between forward thrust and reverse thrust positions. In the forward thrust position, the doors form a portion of the cowling and close a reverse thrust opening formed in the cowling. In the reverse thrust positions, the doors move so as to open the reverse thrust opening and to redirect a portion of the gas flow bounded by the cowling through the reverse thrust opening. The trust reverser doors are hinged near their rear, or downstream, edge such that the forward, or upstream, edge of the door pivots outwardly from the cowling.

FIGS. 1 and 2 illustrate known thrust reversers. As can be seen in these figures, the cowling 1 typically comprises an upstream stationary portion 4, and downstream stationary portion 3 connected by axially extending portions 18 bounding a reverse thrust opening through the cowling. A movable assembly 2 comprises a door 7 having an outer wall 9 and an inner wall 11. When the door 7 is in its forward thrust position, the outer wall 9 is substantially flush with the outer surfaces of the upstream stationary portion 4 and the downstream stationary portion 3 so as to permit undisturbed air flow around the exterior of the cowling, as illustrated by arrow 8. The cowling 1, in combination with the door 7 forms a boundary of a duct through which pressurized gas flows in the direction indicated by arrow 10, from an upstream to a downstream direction (left to right as viewed in FIG. 1).

The door 7 is connected to an actuator 7a which has one end fixedly attached to an upstream structure 6 formed as part of the upstream stationary portion 4 and an extendable and retractable rod connected to the door 7. Extension of the rod from the actuator 7a causes the door 7 to pivot about pivot axis 12 in a clockwise direction such that the upstream edge of the door 7 moves outwardly from the cowling. The downstream portion of the door 7 moves into the gas flow 10 so as to redirect this flow through the reverse thrust opening, outwardly and forwardly of the cowling.

In order to provide a forward component to the gases passing through the reverse thrust opening, the door 7 may have a deflector 13 at its upstream edge. The inner wall 11 converges toward the outer wall 9 in the upstream direction so as to form a cavity 16 facing inwardly when the door 7 is in its forward thrust position.

Examples of such known thrust reversers may be found in French Patent Nos. 1,482,538 and 2 030 034. U.S. Pat. No. 3,605,411 discloses such a thrust reverser door having an upstream deflector extension, and French Patent No. 2 618 853 discloses such a thrust reverser having an upstream deflector that is retracted when the door is in its forward thrust position. Another example of a thrust reverser optimizing the flow of the gas within the duct bounded by the cowling may be found in French Patent No. 2 680 547.

While the known thrust reversers have provided generally satisfactory performance, they have required separate locking means to ensure that the door is not prematurely deployed from its forward thrust position toward its reverse thrust position. Quite obviously, such a premature door deployment could have catastrophic effects upon the aerodynamic characteristics of the aircraft with which it is associated. In known thrust reversers, the pressures exerted by the pressurized gas on the inner wall 11 of the thrust reverser door 7 will impart a force urging the thrust reverser door toward its reverse thrust position. Such forces exerted by the pressurized gases may be significant, since the area of the reverse thrust openings must be larger than the cross-sectional area of the duct defined by the cowling upstream of the thrust reverser doors. Any gas flow leakage around the thrust reverser door when in the reverse thrust position must be minimized in order to achieve the maximum thrust reversing force.

The gas pressure forces acting on the thrust reverser door also requires allowances to be made, when dimensioning the thrust reverser, for very high transient stresses in the door actuators, specifically at the attachment points between the actuators and the stationary structure, as well as the actuators and the door. Thus, the weight and mass of the thrust reverser assembly is increased.

SUMMARY OF THE INVENTION

A thrust reverser is disclosed in which a panel is pivotally attached to the cowling downstream of the movable thrust reverser door and is connected to the door such that movement of the thrust reverser door causes the panel to pivot about its attachment to the cowling. When the door is in its forward thrust position, the inner wall of the door and an inner wall of the panel form a portion of the boundary of the duct through which pass pressurized gases. The pressurized gases exert forces on the inner wall of the door and the inner surface of the panel such that the forces urge the thrust reverser door toward its forward thrust position. Thus, the thrust reverser door is prevented from being inadvertently deployed toward its reverse thrust position even upon failure or malfunction of the door locking or latching mechanisms.

The invention also enables the attachments of the actuator to the cowling and to the door to be made lighter, since the high level transient stresses exerted on these elements are reduced due to the biasing forces of the pressurized gas urging the door toward its forward thrust position. Thus, the thrust reverser assemblies may be made lighter than the known thrust reversers.

The panel may be pivotally attached to the cowling so as to pivot about its axis in a direction opposite to the pivoting direction of the thrust reverser door as it moves between its forward thrust and reverse thrust positions. Alternatively, the pivot axis of the panel may be located such that the panel pivots in the same direction as the thrust reverser door.

BRIEF DESCRIPTION OF THE DRAWINGS

FIG. 1 is a partial, cross-sectional, schematic view of a known thrust reverser.

FIG. 2 is a perspective view of an engine cowling incorporating the known thrust reverser of FIG. 1.

FIG. 7 is a plan view of a first configuration of the panel utilized with the thrust reverser according to the present invention.

FIG. 8 is a plan view of an alternative configuration of the panel utilized with the thrust reverser according to the present invention.

FIG. 9 is a plan view illustrating the hinge arrangement of the panel utilized with the thrust reverser according to the present invention.

FIG. 10 is a cross-sectional view taken along line X—X in FIG. 9.

DETAILED DESCRIPTION OF THE PREFERRED EMBODIMENTS

Figure 3:
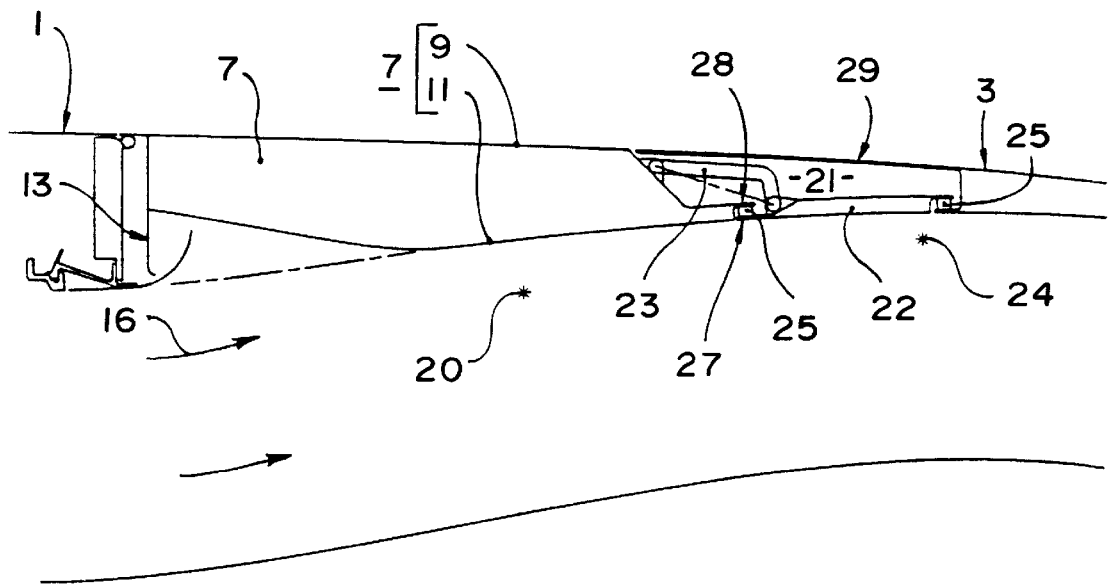
FIG. 3 is a partial, cross-sectional, schematic view illustrating a first embodiment of the thrust reverser according to the present invention in which the thrust reverser door is in a forward thrust position.
Figure 4:
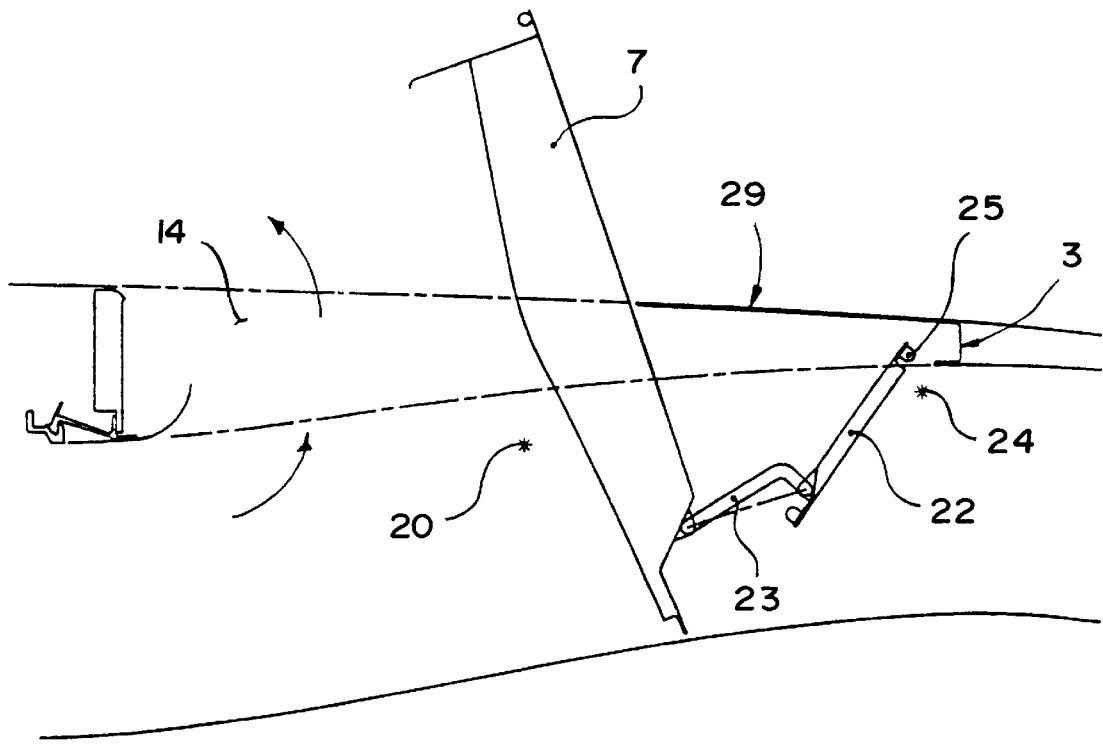
FIG. 4 is a partial, cross-sectional, schematic view similar to FIG. 3 illustrating the thrust reverser door in reverse thrust position.

A first embodiment of the thrust reverser according to the present invention is illustrated in FIGS. 3 and 4. Elements having the same function as elements of the known thrust reversers have been given the same numbers as in FIGS. 1 and 2. As can be seen, the thrust reverser door 7 comprises an outer wall 9 and an inner wall 11, and has an upstream deflector 13. The thrust reverser 7 pivots about pivot axis 20 in a clockwise direction so as to move from the forward thrust position, illustrated in FIG. 3, to the reverse thrust position, illustrated in FIG. 4. When door 7 is in the forward thrust position, inner wall 11 forms a portion of the boundary of a duct through which pressurized gas passes from the left toward the right as illustrated by arrow 16 in FIG. 3. When in the reverse thrust position, the door 7 redirects this gas flow outwardly of the cowling 1 through a reverse thrust opening 14 defined by the cowling assembly.

A panel 22 is pivotally attached to the cowling and is located downstream, i.e. to the rear, of the thrust reverser door 7. In the embodiment illustrated in FIG. 3 and 4, the panel 22 is pivotally attached to the boundary portions 18 of the cowling 1 which portions bound opposite sides of the reverse thrust opening 14. Linkrod 23 connects an upstream, forward portion of the panel 22 to a downstream, rear portion of the thrust reverser door 7 such that, as the thrust reverser door 7 moves from the forward thrust position to the reverse thrust position, panel 22 pivots about pivot axis 24 to the position illustrated in FIG. 4. In this particular embodiment, as the thrust reverser door 7 moves in a clockwise direction about its pivot axis 20, panel 22 moves in a counter-clockwise direction about its pivot axis 24, and vice versa. The panel 22 is located in space 21 formed in a downstream portion 3 of the cowling such that, when the thrust reverser door 7 is in its forward thrust position, the inner surface of panel 22 forms a portion of the boundary surface of the pressurized gas flow duct. The inner surface of the panel 22 is substantially flush with the inner surface of downstream portion 3 of the cowling as well as the inner surface of inner wall 11 of the thrust reverser door 7. These elements are substantially flush so as to provide an aerodynamically efficient surface bounding the gas flow duct. Similarly, an outer wall 29 bounding the space 21 is substantially flush with the outer surface of downstream portion 3, as well as the outer surface of outer wall 9 of the thrust reverser door. Again, this provides an aerodynamically efficient surface for the air flow passing over the exterior of the cowling.

The panel 22 may be connected to the thrust reverser door 7 by one linkrod 23, or a plurality of such linkrods. The number depends upon the specific application of the thrust reverser considering such factors as the widths of the thrust reverser door 7 and the panel 22. The width is the dimension measured generally transverse to the axial length of the cowling. The width of the panel 22 may be the same as, less than, or greater than the width of the associated thrust reverser door 7, again, depending upon the desired characteristics in a specific application of the thrust reverser.

Seals 25 are located between the downstream edge of the panel 22 and an adjacent portion of the downstream portion 3 of the cowling, as well as between an upstream portion of the panel 22 and a downstream edge portion of the associated thrust reverser door 7. Seals 25 prevent leakage of the pressurized gas from the duct when the thrust reverser door 7 is in its forward thrust position.

Pressurized gas within the duct acts on the inner surface of inner wall 11, as well as the inner surface of panel 22 when the thrust reverser door 7 is in its forward thrust position such that the forces exerted on these elements by the pressurized gas biases or urges the thrust reverser door toward its forward thrust position, as illustrated in FIG. 3. Such a biasing forces prevents the inadvertent deployment of the thrust reverser door 7 towards the reverse thrust position, even if the associated locking system should fail or malfunction.

When the pivot 24 of the panel 21 is associated with the boundary portions 18 of the cowling, the panel 22 may assume a generally rectangular configuration, as illustrated in FIG. 7. If panel 22 is attached to downstream cowel portion 3 such that the pivot axis 24 passes through the downstream portion 3 of the cowling, the panels 22 may assume the configuration in FIG. 8. Quite obviously, other configurations may be utilized depending upon the criteria of each specific application without exceeding the scope of this invention.

Adjustment means may be provided either in the linkrod 23, or at either one of its attachment points to the panel 22, or the thrust reverser door 7 to enable the positions of these elements to be adjusted so as to ensure the alignment of the inner surfaces of wall 11 and the panel 22 to eliminate any disturbances in the gas flow through the duct.

Figure 11:
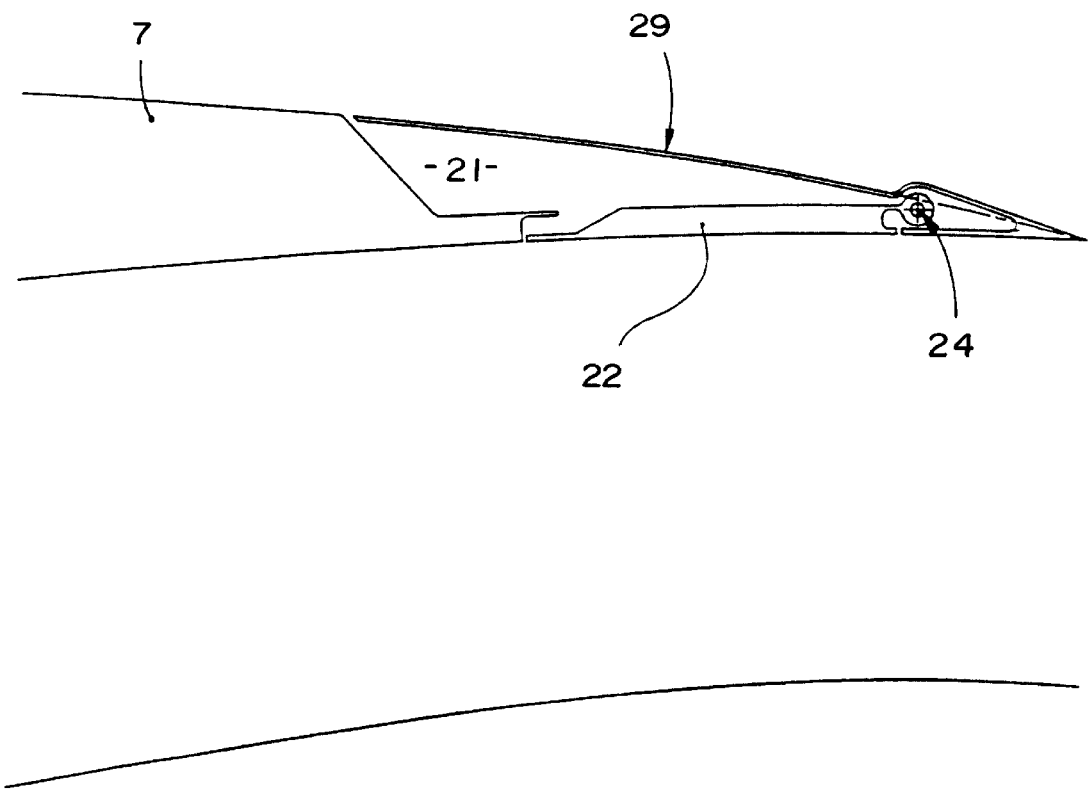
FIG. 11 is a partial, schematic, cross-sectional view illustrating a third embodiment of the thrust reverser according to the present invention.

The downstream panel 22 has two zones relative to its pivot axis, namely an upstream zone of defined length and a downstream zone for which a minimal length is desired. The embodiment illustrated in FIG. 11 illustrates an application in which the downstream zone has a zero length, wherein the pivot axis 24 is located at the downstream edge of the panel 22. The means pivotally attaching the panel 22 so as to pivot about axis 24 may be located in a localized bulge formed in the outer surface of the cowling or in the outer wall of the inner surface of the cowling forming the boundary of the gas flow duct. In some applications, the housing bulges for the pivot attachments may extend beyond the downstream edge of the cowling in a downstream direction.

Figure 5:
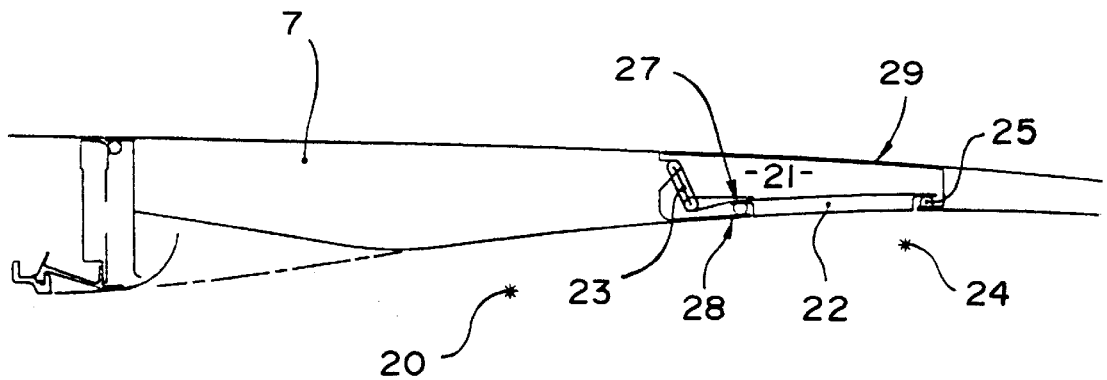
FIG. 5 is a partial, cross-sectional, schematic view illustrating a second embodiment of the thrust reverser according to the present invention with the thrust reverser door in its forward thrust position.
Figure 6:
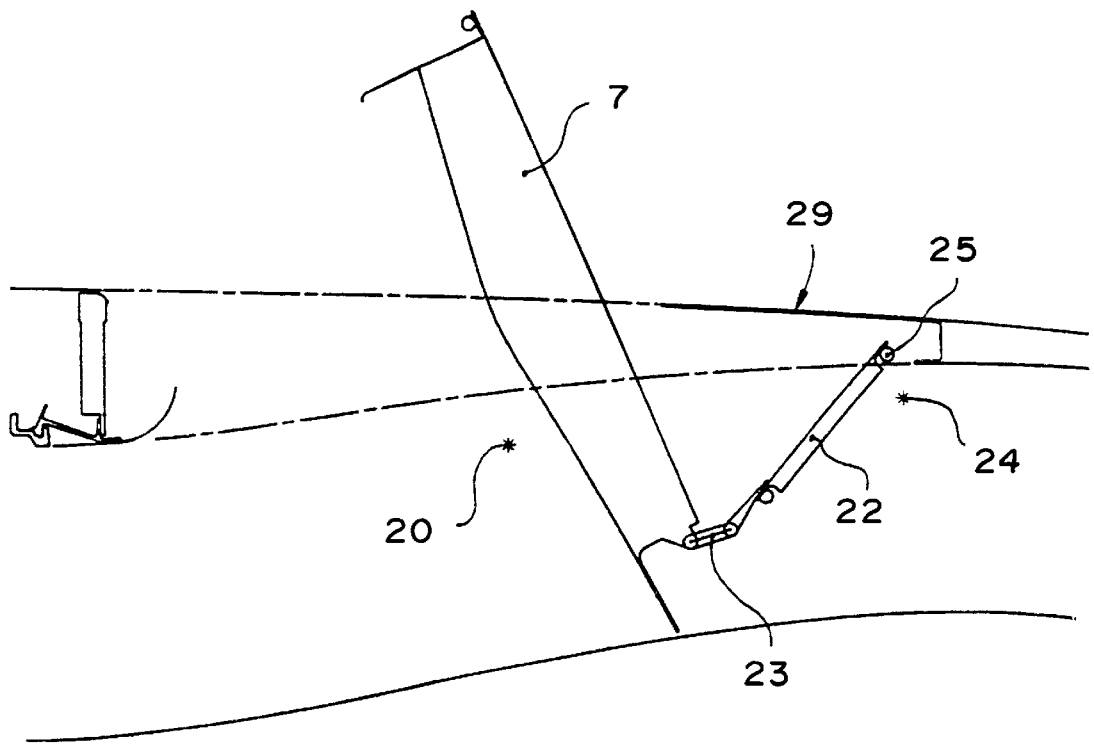
FIG. 6 is a view similar to FIG. 5, illustrating the thrust reverser door in its reverse thrust position.

In the embodiment illustrated in FIGS. 3 and 4, the upstream edge 27 of the panel 22 is located radially inwardly (in a direction away from outer walls 9 and 29) of the downstream edge 28 of the trust reverser door 7 with the seal 25 being located between these respective edges. In the embodiment illustrated in FIGS. 5 and 6, the upstream edge 27 of the panel 22 is located radially outwardly of the downstream edge 28, again with the seal 25 being located therebetween. Otherwise, the functioning of the embodiment illustrated in FIGS. 5 and 6 is exactly the same as that of the previously described embodiment illustrated in FIGS. 3 and 4.

FIGS. 9 and 10 illustrate an embodiment of a hinge 26 associated with the panel 22 so as to pivotally attach the panel 22 to the cowling such that the entire axial length of the panel 22 is located upstream of the pivot axis 24. Seals 25 may be installed either on the downstream panel 22, or the seals may be attached to the thrust reverser door 7 and the downstream portion 3 of the cowling.

Figure 12:
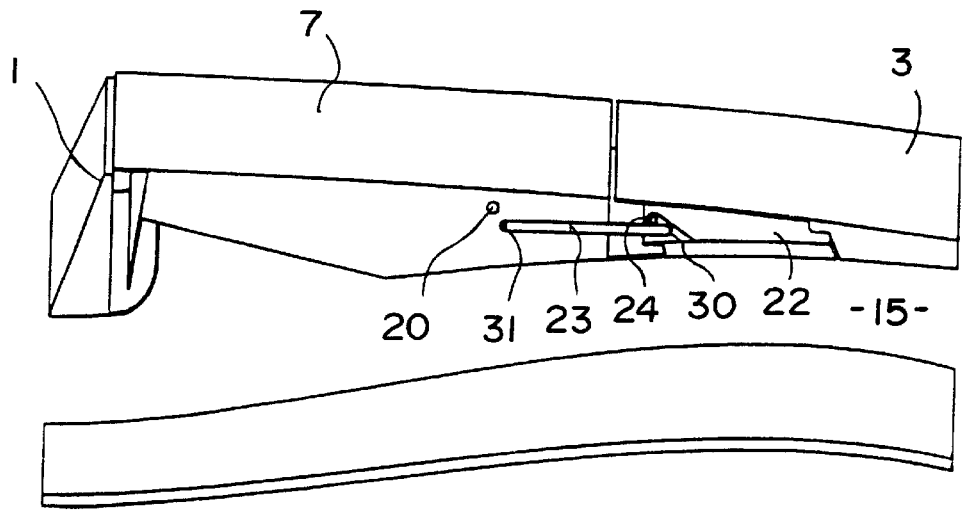
FIG. 12 is a partial, cross-sectional, schematic view of a fourth embodiment of the thrust reverser according to the present invention with the thrust reverser door in a forward thrust position.
Figure 13:
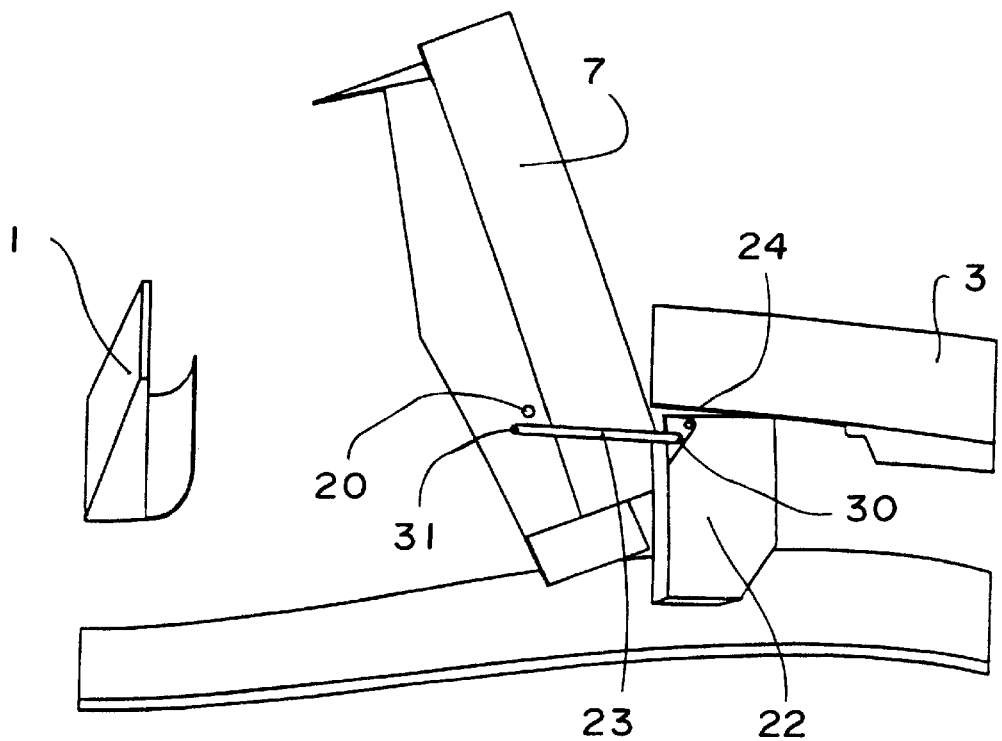
FIG. 13 is a view similar to FIG. 12 illustrating the thrust reverser door in a reverse thrust position.

FIGS. 12 and 13 illustrate an embodiment of the present invention in which the thrust reverser door 7 and the panel 22 pivot in the same direction about their respective pivot axes as the door 7 moves between the forward thrust and reverse thrust positions. In this embodiment, the panel 22 is pivotally attached to the downstream portion 3 of the cowling adjacent to its upstream edge. The connection of linkrod 23 to the panel at 30 and to the thrust reverser door at 31 will cause the panel 22 to exert a force on the thrust reverser door 7 urging it toward its forward thrust position due to the force of the pressurized gas acting on the inner surface of the panel 22 which will tend to cause it to pivot in a counter-clockwise direction about its pivot axis 24. As in the previous embodiment, one or more linkrods 23 may be utilized to connect the panel 22 and the door 7, depending upon the criteria of each specific application. The pivot axis 24 and the connection 30 may advantageously be incorporated into the same fitting attached to the panel 22. In this embodiment, the connection points 30 and 31 are located radially inwardly of the pivot axes 20 and 24, however, it is to be understood that these connections may be also both located radially outwardly of the pivot axis 20 and 24.

In all embodiments of this invention, the positions of the pivot axis 20 and the pivot axis 24 are determined such that, in the forward thrust position, the gas flow passing through the duct will generate forces applied to the inner surface of wall 11 and to the inner surface of downstream panel 22 such that the forward thrust position of thrust reverser door 7 becomes a stable position with the resultant forces acting in the direction of keeping the thrust reverser door 7 in its forward thrust position. This advantage over the known thrust reversers is achieved without a weight penalty and, indeed, with the resultant forces acting on the thrust reverser door urging it towards its forward thrust position, the high stresses exerted on the actuator and its connecting points in the known systems are avoided. This enables the actuators and their connections to be reduced in weight over the prior art systems.

As soon as the thrust reverser door 7 is displaced from its forward thrust position, the seals 25 no longer act as seals and, as soon as the thrust reverser door 7 reaches a specified opening angle, the pressure from the gas flow inside the duct no longer is applied against the inner wall 11 of the door 7 and the inner surface of panel 22. Therefore, these forces do not oppose the opening of the thrust reverser door 7 and, therefore, the present invention does not require the actuator to be enlarged or reinforced in any fashion whatsoever. The pressure of the deflected gas flow does not act in any way on panel 22 and, consequently, a lightweight structure may be utilized for this panel.

For a given thrust reverser geometry, the present invention also makes it possible to adjust the thrust reverser operation by changing the aperture angle of the thrust reverser door 7 in order to refine or improve performance in the reverse thrust position. In particular, the length of the downstream zone of the thrust reverser door 7 and the upstream zone of the panel 22 may be changed without effecting the aerodynamics in the forward thrust position.

The panel 22 may be formed of a single piece, or, alternatively, may be composed of several pieces in which case the several pieces must be sealed against each other to prevent gas flow leakage.

The foregoing description is provided for illustrative purposes only and should not be construed as in any way limiting this invention, the scope of which is defined solely by the appended claims.

We claim:

1. A thrust reverser for a turbojet engine having a cowling with an axial length and bounding a flow duct for a pressurized gas through which the pressurized gas flows in an upstream to downstream direction, the thrust reverser comprising:

a) at least one reverse thrust opening formed in the cowling;

b) at least one thrust reverser door pivotally attached to the cowling so as to pivot about a first pivot axis between a forward thrust position wherein the at least one thrust reverser door closes the at least one reverse thrust opening and forms a portion of the boundary for the flow duct, and a reverse thrust position wherein the at least one thrust reverser door opens the at least one reverse thrust opening and blocks a portion of the flow duct so as to direct the pressurized gas through the at least one reverse thrust opening;

c) a panel located downstream of the at least one thrust reverser door, and pivotally attached to the cowling; and, d) a linkrod connected to a front, upstream portion of the panel and to a rear, downstream portion of the at least one thrust reverser door whereby the panel pivots relative to the cowling about a second pivot axis located downstream of the connection of the linkrod to the panel, the at least one thrust reverser door and the panel pivoting in opposite directions about the first and second pivot axes when the at least one thrust reverser door moves between the forward and reverse thrust positions, such that, when the at least one thrust reverser door is in the forward thrust position, the panel forms a portion of the boundary for the flow duct whereby the pressurized gas acting on the at least one thrust reverser door and the panel urges the at least one thrust reverser door to the forward thrust position.

2. The thrust reverser of claim 1 further comprising a seal between a downstream portion of the panel and the cowling, and a seal between the panel and the at least one thrust reverser door to prevent leakage of the pressurized gas when the at least one thrust reverser door is in the forward thrust position.

3. The thrust reverser of claim 1 further comprising boundary portions of the cowling bounding opposite sides of the at least one reverse thrust opening wherein the panel is pivotally attached to the boundary portions of the cowling.

4. The thrust reverser of claim 1 wherein the cowling further comprises a rear portion located downstream of the panel, wherein the panel is pivotally attached to the rear portion of the cowling.

5. The thrust reverser of claim 1 wherein a width of the panel measured in a direction generally transverse to the axial length of the cowling, is approximately equal to a width of the at least one thrust reverser door, measured in a direction generally transverse to the axial length of the cowling.

6. The thrust reverser of claim 1 wherein a width of the panel, measured in a direction generally transverse to the axial length of the cowling, is less than a width of the at least one thrust reverser door, measured in a direction generally transverse to the axial length of the cowling.

7. The thrust reverser of claim 1 wherein a width of the panel, measured in a direction generally transverse to the axial length of the cowling, is greater than a width of the at least one thrust reverser door, measured in a direction generally transverse to the axial length of the cowling.

* * * * *